(12) United States Patent
Courtney et al.

(10) Patent No.: US 9,688,320 B2
(45) Date of Patent: Jun. 27, 2017

(54) SIDE SKIRT SYSTEM FOR A TRAILER

(71) Applicant: WABASH NATIONAL, L.P., Lafayette, IN (US)

(72) Inventors: Michael J. Courtney, Dayton, IN (US); Leonard W. Baker, Lafayette, IN (US); James A. Sweet, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 14/923,610

(22) Filed: Oct. 27, 2015

(65) Prior Publication Data

US 2016/0121940 A1   May 5, 2016

Related U.S. Application Data

(60) Provisional application No. 62/072,216, filed on Oct. 29, 2014.

(51) Int. Cl.
*B62D 35/02*    (2006.01)
*B62D 35/00*    (2006.01)

(52) U.S. Cl.
CPC .................................. *B62D 35/001* (2013.01)

(58) Field of Classification Search
CPC .... B62D 35/02; B62D 35/001; B62D 35/002; B62D 35/008
USPC .................................. 296/180.1, 180.4, 78.1
See application file for complete search history.

(56) References Cited

U.S. PATENT DOCUMENTS

| | | |
|---|---|---|
| 357,800 A | 2/1887 | Wescott |
| 495,801 A | 4/1893 | Henthome |
| 564,027 A | 7/1896 | Pratt |
| 824,541 A | 6/1906 | Hager et al. |
| 1,127,241 A | 2/1915 | Hawksworth |
| 2,318,863 A | 5/1943 | Jabelmann |
| 2,737,411 A | 3/1956 | Potter |
| 3,256,655 A | 6/1966 | Teter |
| 3,401,953 A | 9/1968 | Prohl et al. |
| 3,483,939 A | 12/1969 | Maddock et al. |
| 3,608,928 A | 9/1971 | Hooker |

(Continued)

FOREIGN PATENT DOCUMENTS

| | | |
|---|---|---|
| CA | 2651688 A1 | 7/2009 |
| CA | 2715304 A1 | 3/2011 |

(Continued)

OTHER PUBLICATIONS

Office action in U.S. Appl. No. 13/413,998 dated Nov. 2, 2012 (9 pages).

(Continued)

*Primary Examiner* — Dennis H Pedder
(74) *Attorney, Agent, or Firm* — Carli E. Stewart (57) ABSTRACT

An aerodynamic skirt system for reducing drag on a trailer includes a first side skirt wall and a second side skirt wall each configured to be coupled to one side of the trailer to extend generally below a storage container of the trailer at least partially along a length of the trailer. The first side skirt wall defines a first length and the second side skirt wall defines a second length smaller than the first length. The second side skirt wall is positioned generally rearward of the first side skirt wall and is side skirt wall is angled relative to the side wall of the trailer.

16 Claims, 3 Drawing Sheets

(56) References Cited

U.S. PATENT DOCUMENTS

| | | |
|---|---|---|
| 3,711,146 A | 1/1973 | Madzsar et al. |
| 3,852,965 A | 12/1974 | Rudd |
| 3,859,797 A | 1/1975 | Ayers |
| 4,006,932 A | 2/1977 | McDonald |
| 4,045,962 A | 9/1977 | Preus |
| 4,060,268 A | 11/1977 | Page, Jr. |
| 4,103,918 A | 8/1978 | Salden |
| 4,104,884 A | 8/1978 | Preus |
| 4,142,755 A | 3/1979 | Keedy |
| 4,190,381 A | 2/1980 | Knaus et al. |
| 4,236,745 A | 12/1980 | Davis |
| 4,262,961 A * | 4/1981 | Schmidt .............. B65D 88/121 105/414 |
| 4,282,946 A | 8/1981 | MacGuire |
| 4,352,502 A | 10/1982 | Leonard et al. |
| 4,421,333 A | 12/1983 | Van Dyke |
| 4,611,847 A | 9/1986 | Sullivan |
| 4,688,824 A | 8/1987 | Herring |
| 4,746,160 A | 5/1988 | Wiesemeyer |
| 4,943,204 A | 7/1990 | Ehrlich |
| 5,058,945 A | 10/1991 | Elliott, Sr. et al. |
| 5,094,744 A | 3/1992 | Scovell |
| 5,152,228 A | 10/1992 | Donkin |
| 5,280,990 A | 1/1994 | Rinard |
| D354,726 S | 1/1995 | Fitzgerald et al. |
| 5,489,137 A | 2/1996 | Herrmeyer |
| 5,607,200 A | 3/1997 | Smidler |
| 5,673,953 A | 10/1997 | Spease |
| 5,823,610 A | 10/1998 | Ryan |
| 5,921,617 A | 7/1999 | Loewen et al. |
| 6,079,769 A | 6/2000 | Fannin et al. |
| 6,092,861 A | 7/2000 | Whelan |
| 6,109,675 A | 8/2000 | Sumrall |
| 6,116,667 A | 9/2000 | Torcomian |
| 6,257,654 B1 | 7/2001 | Boivin et al. |
| 6,286,894 B1 | 9/2001 | Kingham |
| 6,309,010 B1 | 10/2001 | Whitten |
| 6,409,252 B1 | 6/2002 | Andrus |
| 6,443,492 B1 | 9/2002 | Barr et al. |
| 6,467,833 B1 | 10/2002 | Travers |
| 6,485,087 B1 | 11/2002 | Roberge et al. |
| 6,595,578 B1 | 7/2003 | Calsoyds et al. |
| 6,626,475 B2 | 9/2003 | Schroeder |
| 6,644,720 B2 | 11/2003 | Long et al. |
| 6,666,498 B1 | 12/2003 | Whitten |
| 6,799,791 B2 | 10/2004 | Reiman et al. |
| 6,837,536 B1 | 1/2005 | Schwartz |
| 6,893,079 B1 | 5/2005 | Johnson et al. |
| 6,915,611 B2 | 7/2005 | Reiman et al. |
| 6,959,958 B2 | 11/2005 | Basford |
| 6,974,166 B2 | 12/2005 | Ledford et al. |
| 6,974,178 B2 | 12/2005 | Ortega et al. |
| 7,059,819 B2 | 6/2006 | Brackmann et al. |
| 7,086,674 B2 | 8/2006 | Goertz |
| 7,093,889 B2 | 8/2006 | Graham |
| 7,134,820 B2 | 11/2006 | Ehrlich |
| 7,147,270 B1 | 12/2006 | Andrus et al. |
| 7,163,258 B2 | 1/2007 | Dyer, II et al. |
| 7,188,875 B2 | 3/2007 | Norelius |
| 7,347,154 B2 | 3/2008 | Evans |
| 7,404,592 B2 | 7/2008 | Reiman et al. |
| 7,407,204 B2 | 8/2008 | Eriksson et al. |
| 7,431,381 B2 | 10/2008 | Wood |
| 7,497,502 B2 | 3/2009 | Wood |
| 7,537,270 B2 | 5/2009 | O'Grady |
| 7,578,541 B2 | 8/2009 | Layfield et al. |
| 7,604,284 B2 | 10/2009 | Reiman et al. |
| 7,665,716 B2 | 2/2010 | Reast |
| 7,686,385 B2 | 3/2010 | Dolan et al. |
| 7,740,303 B2 | 6/2010 | Wood |
| 7,748,772 B2 | 7/2010 | Boivin et al. |
| 7,780,224 B2 | 8/2010 | Roush |
| 7,837,254 B2 | 11/2010 | Reiman et al. |
| 7,887,120 B2 | 2/2011 | Boivin et al. |
| 7,938,475 B2 | 5/2011 | Boivin et al. |
| 7,942,466 B2 | 5/2011 | Reiman et al. |
| 7,942,467 B2 | 5/2011 | Boivin et al. |
| 7,942,468 B2 | 5/2011 | Boivin et al. |
| 7,942,469 B2 | 5/2011 | Boivin et al. |
| 7,942,470 B2 | 5/2011 | Boivin et al. |
| 7,942,471 B2 | 5/2011 | Boivin et al. |
| 7,950,721 B1 | 5/2011 | Peterson |
| 7,967,349 B2 | 6/2011 | Puppini et al. |
| 8,162,384 B2 | 4/2012 | Giromini et al. |
| 8,177,286 B2 | 5/2012 | Brown et al. |
| 8,191,956 B1 | 6/2012 | Dixon et al. |
| 8,210,599 B2 | 7/2012 | Butler |
| 8,303,025 B2 | 11/2012 | Senatro |
| 8,382,194 B2 | 2/2013 | Wood |
| 8,398,150 B2 | 3/2013 | Brown et al. |
| 8,408,570 B2 | 4/2013 | Heppel et al. |
| 8,496,286 B1 | 7/2013 | Katz et al. |
| 8,579,359 B2 | 11/2013 | Brown et al. |
| 8,616,616 B2 | 12/2013 | Van Raemdonck |
| 8,783,758 B2 | 7/2014 | Baker |
| 8,801,078 B2 | 8/2014 | Brown et al. |
| 8,857,893 B2 | 10/2014 | Reiman et al. |
| 8,899,660 B1 | 12/2014 | Praskovskaya et al. |
| 8,973,973 B2 | 3/2015 | Kronemeyer |
| 8,979,172 B2 | 3/2015 | Reiman et al. |
| 8,985,677 B2 | 3/2015 | Wiegel |
| 9,004,575 B2 | 4/2015 | Grandominico et al. |
| 9,045,176 B1 | 6/2015 | Henderson, II |
| 9,139,241 B1 | 9/2015 | Smith |
| 9,199,673 B2 | 12/2015 | Baker |
| 9,199,676 B2 | 12/2015 | Brown et al. |
| 9,211,919 B2 | 12/2015 | Senatro |
| 9,296,433 B2 | 3/2016 | Roush |
| 9,308,949 B1 | 4/2016 | Mihelic et al. |
| 2003/0178611 A1 | 9/2003 | Anderson |
| 2005/0040637 A1 | 2/2005 | Wood |
| 2005/0067204 A1 | 3/2005 | Rijsbergen et al. |
| 2005/0115776 A1 | 6/2005 | Doerflinger et al. |
| 2005/0161976 A1 | 7/2005 | Ortega et al. |
| 2006/0152038 A1 | 7/2006 | Graham |
| 2006/0182580 A1 | 8/2006 | Petersen |
| 2007/0114757 A1 | 5/2007 | Vickroy |
| 2007/0120397 A1 | 5/2007 | Layfield et al. |
| 2007/0176466 A1 | 8/2007 | Dolan et al. |
| 2008/0061597 A1 | 3/2008 | Reiman et al. |
| 2008/0061598 A1 | 3/2008 | Reiman et al. |
| 2008/0093887 A1 | 4/2008 | Wood |
| 2008/0116702 A1 | 5/2008 | Enz et al. |
| 2009/0189414 A1 | 7/2009 | Boivin et al. |
| 2009/0212595 A1 | 8/2009 | Heppel et al. |
| 2009/0212596 A1 | 8/2009 | Reiman et al. |
| 2009/0218848 A1 | 9/2009 | Boivin et al. |
| 2010/0096880 A1 | 4/2010 | Boivin et al. |
| 2010/0096881 A1 | 4/2010 | Boivin et al. |
| 2010/0096882 A1 | 4/2010 | Boivin et al. |
| 2010/0096883 A1 | 4/2010 | Boivin et al. |
| 2010/0098481 A1 | 4/2010 | Boivin et al. |
| 2010/0231000 A1 | 9/2010 | Andrus et al. |
| 2010/0264690 A1 | 10/2010 | Brown et al. |
| 2010/0264691 A1 | 10/2010 | Giromini |
| 2011/0025092 A1 | 2/2011 | Reiman et al. |
| 2011/0062749 A1 | 3/2011 | Graham et al. |
| 2011/0148142 A1 | 6/2011 | Kint |
| 2011/0175396 A1 | 7/2011 | Boivin et al. |
| 2011/0204677 A1 | 8/2011 | Wood et al. |
| 2011/0285167 A1 | 11/2011 | Butler |
| 2012/0091754 A1 | 4/2012 | Lee et al. |
| 2012/0169086 A1 | 7/2012 | Giromini |
| 2012/0200113 A1 | 8/2012 | Brown et al. |
| 2012/0235441 A1 | 9/2012 | Dayton |
| 2012/0319428 A1 | 12/2012 | Wood |
| 2013/0119701 A1 | 5/2013 | Dayton |
| 2013/0181477 A1 | 7/2013 | Reiman et al. |
| 2013/0270857 A1 | 10/2013 | Brown et al. |
| 2013/0285411 A1 | 10/2013 | Layfield et al. |
| 2014/0035318 A1 | 2/2014 | Brown et al. |
| 2014/0159419 A1 | 6/2014 | Baker |
| 2014/0252799 A1 | 9/2014 | Smith |
| 2014/0333089 A1 | 11/2014 | Brown et al. |

(56) References Cited

U.S. PATENT DOCUMENTS

| | | |
|---|---|---|
| 2015/0259014 A1 | 9/2015 | Baker |
| 2016/0121940 A1 | 5/2016 | Courtney |
| 2016/0244108 A1 | 8/2016 | Tsuruta et al. |

FOREIGN PATENT DOCUMENTS

| | | |
|---|---|---|
| CA | 2810007 | 9/2013 |
| CA | 2812316 A1 | 10/2013 |
| CA | 2860351 A1 | 2/2015 |
| CA | 2905596 A1 | 4/2016 |
| EP | 0 738 621 | 10/1996 |
| EP | 0 857 620 | 8/1998 |
| JP | 2007223359 A | 9/2007 |
| KR | 20110059021 | 6/2011 |
| NI | 1034363 C2 | 2/2009 |
| WO | 9748590 A1 | 12/1997 |
| WO | 03 093066 | 11/2003 |

OTHER PUBLICATIONS

AeroFlex Fairing™ product info Page (1 page), Jul. 7, 2010.
AeroFlex Belly Fairing™ product info Page (2 pages), Jul. 7, 2010.
AeroFlex Low Rider Belly Fairing product info Page (1 page), Jul. 7, 2010.
AeroFlex Freight Wing chassis Belly Fairing product info Page (1 page) Jul. 7, 2010.
Trailer Fairings from http://www.laydoncomp.cm/trailer-skirts.php (3 pages), Jul. 7, 2010.
Trailerskirt™ Assembly Instructions, Jun. 12, 2009 REV. 8.0 supersedes all other version, LCL-ENG-045, (7 pages).
"MFS Skirt, Maximum Flex Skirt", Transtech Composite, (2 pages), undated material.
Side Skirt Fairing: Overview: "Aeroefficient-Aerodynamic Solution for the Trucking Industry", 2010 Aeroefficient (12 pages).
Truck Fuel Savings, Aerodynamic Fairing, Aerodynamic Parts, Truck Industry "WINDYNE", (2 pages) Jul. 7, 2010.
Laydon Composites, LTD website Trailer Skirt Catalog as existed on Feb. 7, 2009, accessed via the internet ArchiveWayBack Machine on Oct. 3, 2011, found at http://web.srchive.org/web/20090207195226/http:/www.laydoncormp.com/trailer-skirts.php.
2009 Product catalog for Takler Srl (31 pages).
The International Search Report and the Written Opinion of the International Searching Authority for related International Application No. PCT/US2010/031173, dated Jun. 14, 2010 (13 pages).
Strehl Trailer Blade Brochure, Trailer Blade™ Model 715 Advance Aerodynamic Trailer Skirt, (5 pages), 2009-2010.
Utility Brochure, Innovative Side Skirt Designs From Utility, (2 pages), 2010.
Office Action in U.S. Appl. No. 12/760,798 dated Oct. 13, 2011 (12 pages).
Office Action in U.S. Appl. No. 13/448,931 dated Jun. 29, 2012 (12 pages).
Dec. 12, 2011 letter from Albert L. Undershill Law Office, P.L.L.C. to Carli E Stewart, Chief Patent Counsel, Wabash National, L.P. (2 pages).
Office action in U.S. Appl. No. 13/413,998 dated Jul. 10, 2012 (9 pages).
Office action in U.S. Appl. No. 13/741,639 dated Apr. 5, 2013 (11 pages).
Office action in U.S. Appl. No. 14/049,851 dated Dec. 31, 2013 (11 pages).
Office action in U.S. Appl. No. 14/100,071 dated Mar. 26, 2015 (21 pages).
Office action in U.S. Appl. No. 14/321,977 dated Apr. 3, 2015 (12 pages).
Office action in U.S. Appl. No. 13/847,111 dated Nov. 5, 2013 (6 pages).
Office action in U.S. Appl. No. 14/644,508 dated Nov. 10, 2015 (16 pages).
Nu-Line® Introducing Nu-Line Aerodynamic Trailer Skirts brochure NLTS-0314 (2 pages).

\* cited by examiner

SIDE SKIRT SYSTEM FOR A TRAILER

This application claims priority under 35 U.S.C. §119(e) to U.S. Provisional Patent Application Ser. No. 62/072,216 entitled SIDE SKIRT SYSTEM FOR A TRAILER and filed Oct. 29, 2014, the entirety of which is hereby incorporated by reference herein.

The present application cross-references U.S. Patent Application Publication No. US2015/0259014 titled SIDE SKIRT SYSTEM FOR A TRAILER and filed on Mar. 11, 2015, the entirety of the disclosure of which is hereby incorporated by reference herein. The present application also cross-references U.S. Pat. Nos. 8,177,286; 8,398,150; and 8,579,359 and 8,801,078, the entirety of the disclosures of each of which is hereby incorporated by reference herein. The present application further cross-references U.S. patent application Ser. No. 14/457,222 titled SIDE SKIRT SYSTEM FOR REDUCING DRAG, the entirety of which is hereby incorporated by reference herein. The present application further cross-references U.S. Pat. No. 8,783,758 and U.S. Patent Publication US2014/0159419, the entirety of each of which is hereby incorporated by reference herein.

FIELD OF THE INVENTION

The present invention relates generally to semi-trailers, such as van-type trailers, for example. In particular, the present invention relates to an aerodynamic side skirt system for reducing drag on such a trailer.

BACKGROUND OF THE INVENTION

To reduce wind flow resistance and drag on a trailer, truck, semitrailer, or other vehicle, side skirts have been used which extend downwardly from a bottom of the trailer and/or chassis toward the roadway to partially enclose the floor assembly and undercarriage.

Air flow passing under a ground vehicle imparts a drag force to the vehicle when it impinges the vehicle undercarriage components attached to or part of the underside of a vehicle. Side skirt systems are designed to prevent or control the flow of air from entering the undercarriage region from the side of the ground vehicle, such as a trailer of a tractor-trailer truck system, for example. Certain aerodynamic undercarriage systems are designed to prevent or minimize flow of air under the trailer from impinging on the rear wheel assembly, or bogie, of the ground vehicle. Such reduction on the drag of the ground vehicle may operate to conserve fossil fuels as well as other sources of vehicle drive power for hybrid vehicles, battery-operated vehicles, and alternative fuel-based vehicles, for example.

SUMMARY

The present invention may comprise one or more of the features recited in the attached claims, and/or one or more of the following features and combinations.

According to one aspect of the present disclosure, and aerodynamic skirt system for reducing drag on a trailer includes a first side skirt wall configured to be coupled to the trailer on one side of the trailer to extend generally below a storage container of the trailer at least partially along a length of the trailer. The first side skirt wall defines a first length. The aerodynamic skirt system also includes a second side skirt wall spaced-apart from the first side skirt wall and configured to be coupled to the trailer on the one side of the trailer to extend generally below the storage container of the trailer at least partially along the length of the trailer. The second side skirt wall defines a second length smaller than the first length. The second side skirt wall is positioned generally rearward of the first side skirt wall, and the second side skirt wall is angled relative to the side wall of the trailer.

In one illustrative embodiment, the second side skirt wall may be angled approximately 45 degrees relative to the side wall of the trailer. Illustratively, the first side skirt wall may be generally parallel to the side wall of the trailer.

In another illustrative embodiment, a forward edge of the second side skirt wall may be positioned forward of a rearward edge of the first side skirt wall.

In still another illustrative embodiment, the first length may be greater than two times the second length. Illustratively, the first length may be approximately 127 inches and the second length may be approximately 50 inches.

In yet another illustrative embodiment, the skirt system may define a transversely-extending gap of approximately 30 inches between the first side skirt and a front edge of the second side skirt.

In still another illustrative embodiment, the first side skirt wall may be parallel to a sidewall of the trailer. Further illustratively, the first side skirt wall may be generally planar with the sidewall of the trailer.

In yet another illustrative embodiment, the aerodynamic side skirt system may also include a third side skirt wall configured to be coupled to the trailer on the other side of the trailer to extend generally below a storage container of the trailer at least partially along a length of the trailer. The third side skirt wall may define a length substantially equivalent to the first length. The aerodynamic side skirt system may also include a fourth side skirt wall spaced-apart from the third side skirt wall and configured to be coupled to the trailer on the other side of the trailer to extend generally below the storage container of the trailer at least partially along the length of the trailer. A length of the fourth side skirt wall may be substantially equivalent to the second length. Illustratively, the fourth side skirt wall may be positioned generally rearward of the third side skirt wall. Further illustratively, the fourth side skirt wall may be angled relative to the side wall of the trailer. The aerodynamic side skirt system may also define a transversely-extending gap between a front edge of the second and fourth skirt walls. Illustratively, the transversely-extending gap may be approximately equal to a distance between right and left sets of tires of a rear wheel assembly of the trailer.

In still another illustrative embodiment, a rearward edge of the second side skirt wall may be positioned inwardly of a rearward edge of the first side skirt wall.

In yet another illustrative embodiment, the aerodynamic skirt system may also include a longitudinally-extending gap between a rear edge of the first side skirt wall and a rear wheel assembly of the trailer. Illustratively, the longitudinally-extending gap may be approximately the same length as a lift pad of the trailer. Further illustratively, the aerodynamic skirt system may include a channel between the first and second side skirt walls in order to funnel air from under the trailer out the longitudinally-extending gap when the trailer is traveling down the road.

According to another aspect of the present disclosure, an aerodynamic skirt system for reducing drag on a trailer includes a first side skirt wall configured to be coupled to the trailer on one side of the trailer to extend generally below a storage container of the trailer at least partially along a length of the trailer, and a second side skirt wall spaced-apart from the first side skirt wall and configured to be coupled to the trailer on the one side of the trailer to extend generally below the storage container of the trailer at least partially along the length of the trailer. The aerodynamic skirt system further includes a third side skirt wall configured to be coupled to the trailer on the other side of the trailer to extend generally below the storage container of the trailer at least partially along the length of the trailer, and a fourth side skirt wall spaced-apart from the third side skirt wall and configured to be coupled to the trailer on the other side of the trailer to extend generally below the storage container of the trailer at least partially along the length of the trailer. Illustratively, each of the second and fourth side skirt walls are positioned inwardly of the first and third side skirt walls. The aerodynamic side skirt system further includes a transversely-extending gap between front edges of the second and fourth side skirt walls.

In one illustrative embodiment, the aerodynamic side skirt system may be positioned between a landing gear of the trailer and a rear wheel assembly of the trailer.

In another illustrative embodiment, the aerodynamic side skirt system may also include a generally funnel-shaped channel between each of the first and second side skirt walls and the third and fourth side skirt walls. Illustratively, each channel may be configured to direct air from under the trailer to exit a gap between each respective first side skirt wall and the rear wheel assembly.

According to yet another aspect of the present disclosure, an aerodynamic skirt system for reducing drag on a trailer includes a first side skirt wall configured to be coupled to the trailer on one side of the trailer to extend generally below a storage container of the trailer at least partially along a length of the trailer, and a second side skirt wall spaced-apart from the first side skirt wall and configured to be coupled to the trailer on the one side of the trailer to extend generally below the storage container of the trailer at least partially along the length of the trailer. Illustratively, the side skirt system further includes a longitudinally-extending gap between a rear edge of the first side skirt wall and a rear wheel assembly of the trailer. The longitudinally-extending gap is at least approximately the same length as a lift pad of the trailer. Further, the side skirt system defines a generally funnel-shaped channel between first and second side skirt walls, and wherein the channel is configured to direct air from under the trailer to exit the longitudinally-extending gap.

DESCRIPTION OF THE DRAWINGS

For the purposes of promoting an understanding of the principles of the invention, reference will now be made to illustrative embodiments shown in the attached drawings and specific language will be used to describe the same. While the concepts of this disclosure are described in relation to a truck trailer, it will be understood that they are equally applicable to other vehicles generally, and more specifically to conventional flat-bed and/or box or van type trailers, examples of which include, but should not be limited to, straight truck bodies, small personal and/or commercial trailers and the like. Accordingly, those skilled in the art will appreciate that the present invention may be implemented in a number of different applications and embodiments and is not specifically limited in its application to the particular embodiments depicted herein.

Figure 1:
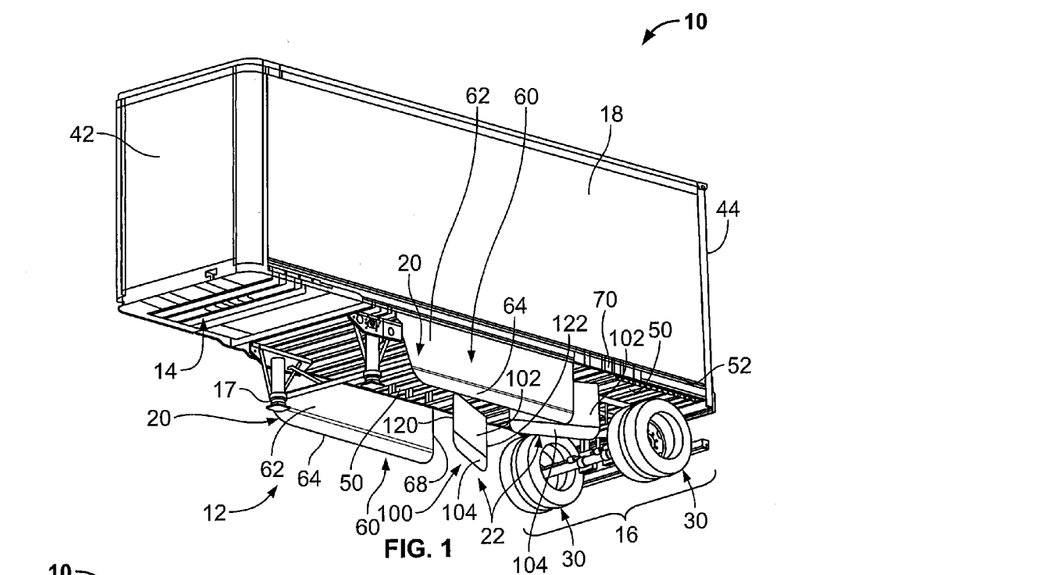
FIG. 1 is a perspective view of a trailer including an aerodynamic skirt system of the present disclosure having a side skirt assembly and a rear wheel, or bogie, skirt assembly each coupled to and extending downwardly from the floor assembly of the trailer.
Figure 2:
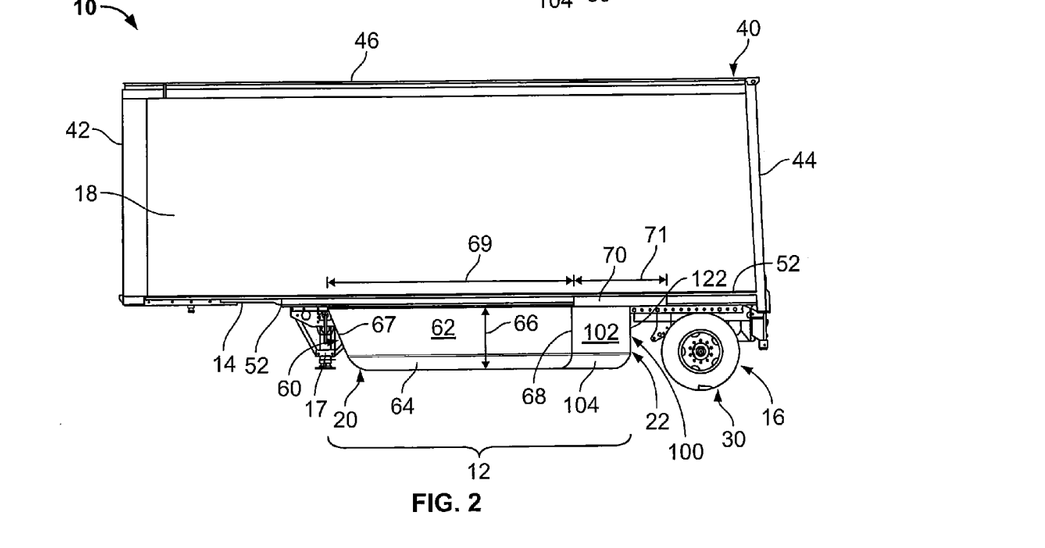
FIG. 2 is a side view of the trailer of FIG. 1 showing the side skirt assembly and the bogie skirt assembly of the skirt system of FIG. 1.
Figure 3:
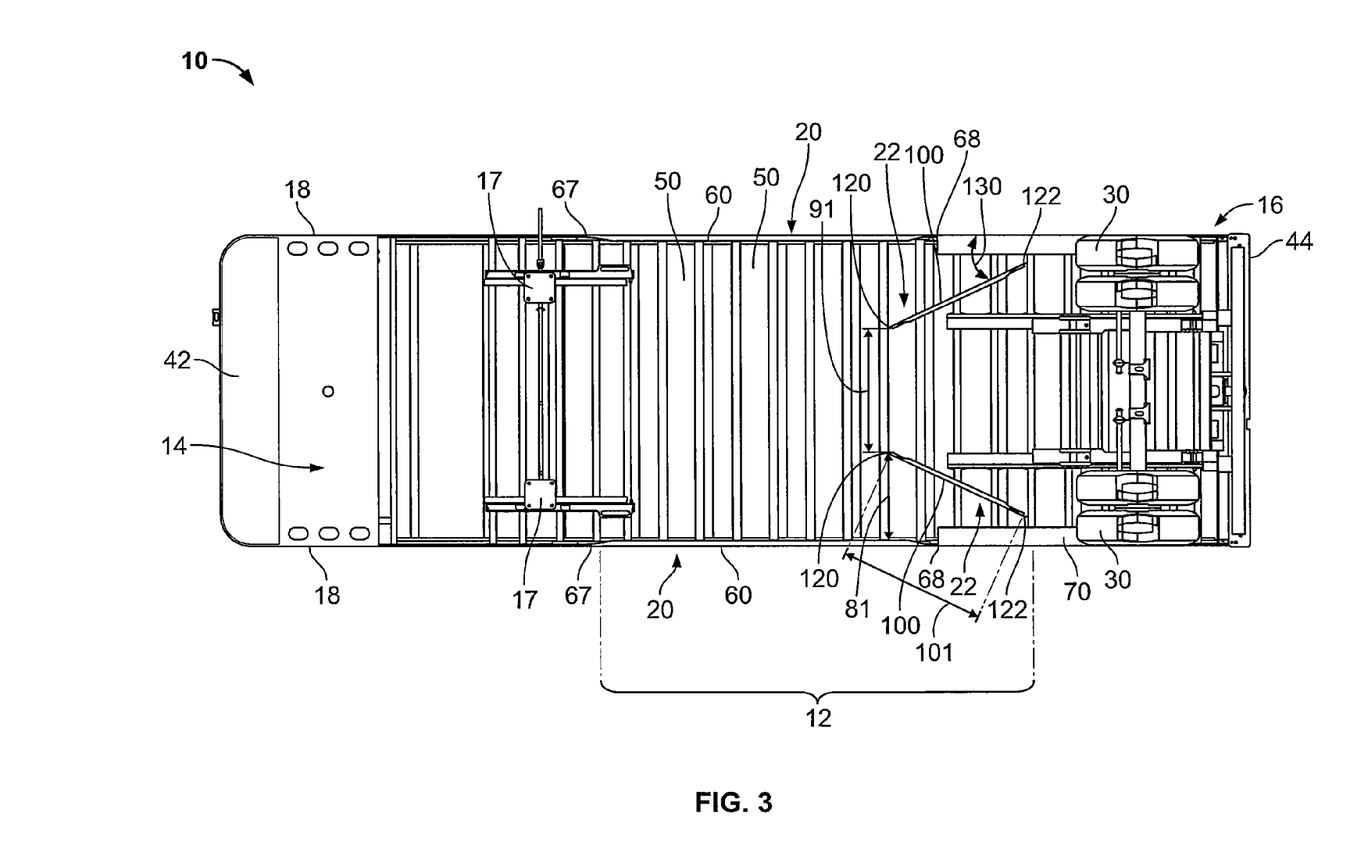
FIG. 3 is a bottom view of the trailer of FIGS. 1 and 2.

Looking to FIGS. 1-3, a trailer 10 includes an aerodynamic skirt system 12 coupled to and extending downwardly from a floor assembly 14 of the trailer 10. Illustratively, the skirt system 12 operates to improve the aerodynamic efficiency of the trailer 10 by reducing drag and wind flow under the sides of the trailer 10 while also deflecting wind flow just forward of the rear wheel assembly, or bogie, 16 of the trailer 10. In particular, the skirt system 12 operates to reduce airflow under the trailer while the trailer 10 is traveling down the road. This reduction of airflow under the trailer 10 may increase the fuel efficiency, or the efficiency of any other such source of vehicle drive power, of the tractor/trailer combination.

Illustratively, the skirt system 12 includes a side skirt assembly 20 configured to extend below a sidewall 18 of the trailer at least partially along a length of the trailer 10. In particular, the side skirt assembly 20 extends generally between the rear wheel assembly 16 of the trailer 10 and the landing gear leg 17 of the trailer 10. The skirt system 12 also includes a bogie skirt assembly 22 positioned generally rearwardly of, and at an angle to, the side skirt assembly 20. In particular, a rearward end 122 of the bogie skirt assembly 22 is generally positioned between the wheels 30 of the rear wheel assembly 16 and the rearward end 68 of the skirt assembly 20 while a forward end of the bogie skirt assembly 22 is generally positioned forward of the rearward end 68 of the skirt assembly 20.

The side skirt assembly 20 and the bogie skirt assembly 22 of the skirt system 12 cooperate to reduce drag and by preventing airflow from entering the undercarriage region of the trailer 10. Further, the skirt system 12 operates to reduce the amount of airflow which becomes trapped under the trailer 10 while the trailer 10 is traveling down the road. As is described in greater detail below, the skirt system 12 operates to allow air that does get under the trailer 10, whether it be via under the skirt system 12 itself, from under the tractor, or by any other means, to be vented out from under the trailer 10 without imparting much if any energy on the trailer 10. Thus, any increase in drag which would have resulted from the air under the trailer 10 is diminished because this air is able to escape out from under the trailer 10. This reduction of airflow under the trailer 10 as well as the ability of the skirt system 12 to allow air from the under the trailer 12 to escape may operate to increase the fuel efficiency, or the efficiency of any other such source of vehicle drive power, of the tractor/trailer combination.

Figure 4:
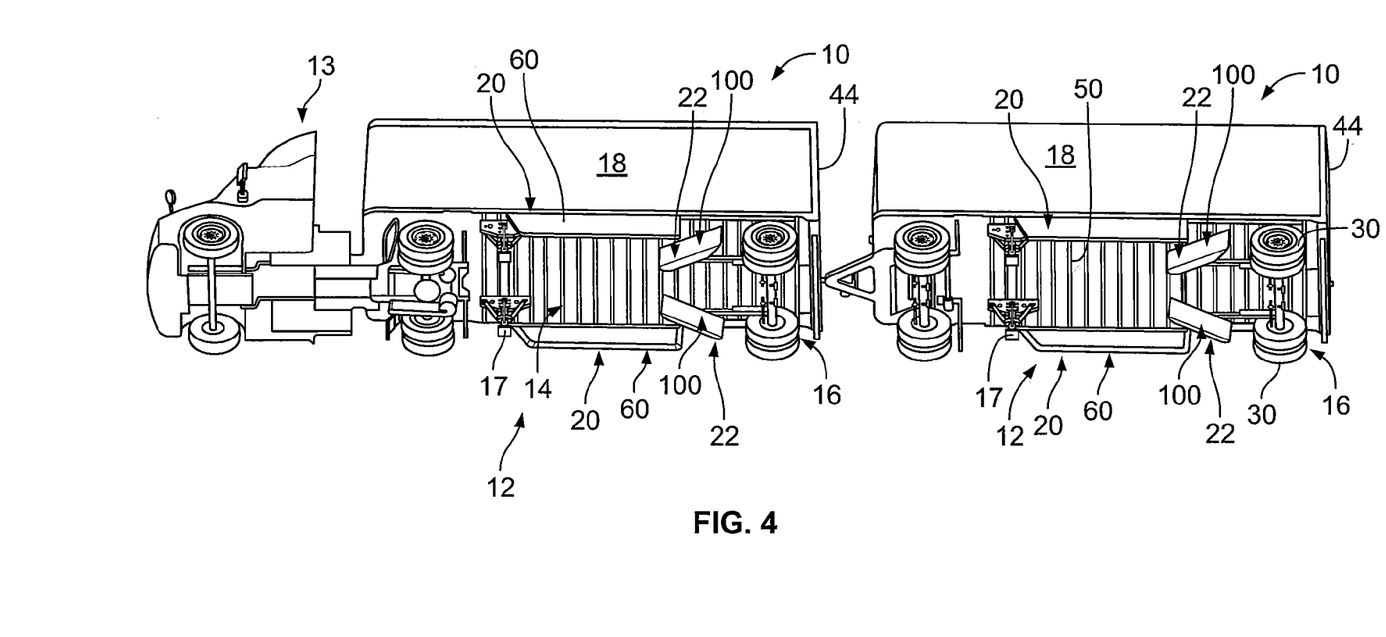
FIG. 4 is a bottom, perspective view of a tractor and tandem trailer assembly including two trailers each having the side skirt system (including the side skirt assembly and bogie skirt assembly) of the present disclosure extending downwardly from the floor assembly thereof.

As shown in FIGS. 1-3, the trailer 10 includes a storage container 40 configured to carry cargo therein. The storage container 40 includes sidewalls 18, a front end wall 42, a rear end wall 44, a roof 46, and the floor assembly 14 which all cooperate together to define an inside storage portion (not shown) of the container 40 able to store various articles or goods therein. The trailer 10 further includes the rear wheel assembly, or bogie, 16 and the front support or landing gear, including the landing gear leg 17, each coupled to the floor assembly 14 of the trailer 10. Illustratively, the floor assembly 14 of the trailer 10 includes various laterally-extending cross members 50 and right and left base rails 52. The cross-members 50 are typically I-beams, though other suitable shapes for the cross-members may be used as well. The front end of the trailer 10 is configured to be coupled to a tractor (such as the tractor 13 shown in FIG. 4) for towing the trailer 10 thereon thus providing a tractor-trailer assembly. Further, the illustrative trailer 10 shown in FIGS. 1-3 is a shortened trailer used in a "doubles" or tandem application with an identical shortened trailer 10, as shown in FIG. 4. Typically, in such an arrangement, the trailers are approximately 28 feet in length and are therefore shorter than the standard trailers which are generally between 48 and 53 feet in length. Illustratively, the tractor/trailer combination in FIG. 4 includes the tractor 13 and two trailers 10 coupled in tandem to each other. As shown in FIG. 4, the trailers 10 shown in FIG. 4 each include the aerodynamic skirt system 12 described herein.

It should be understood that while the aerodynamic skirt system 12 is shown for use with a shortened trailer 10 as part of a "doubles" or tandem tractor/trailer arrangement, the aerodynamic skirt system 12 shown and disclosed herein may also be used with a full-length, or single, trailer 10. The aerodynamic skirt system 12 may be used generally as-is with such a full-length trailer and/or may be altered in length and/or positioning for use with a full-length trailer. It should further be understood that while the aerodynamic skirt system 12 is shown for use with the trailer 10, the skirt system 12 may be coupled to any vehicle to reduce the drag thereon. As shown in FIGS. 1-3, the skirt system 12, including the side skirt assembly 20 and the bogie assembly 22, is generally positioned between the landing gear leg 17 and the rear wheels 30 of the rear wheel assembly 16. The side skirt system 12 operates to both prevent air from flowing laterally under the floor assembly 14 of the trailer 10 while also allowing air that is under the floor assembly 14 of the trailer 10 to exit from under the floor assembly 14 at a location both between the two assemblies 20 and 22 as well as at the rear of the trailer 10 between two adjacent bogie skirt assemblies 22 (as discussed in greater detail below) as the trailer 10 is towed by the tractor 13.

Illustratively, the trailer 10 includes two aerodynamic skirt systems 12, as shown in FIGS. 1 and 3. In particular, one system 12 is coupled to one side of the storage container 15 of the trailer 10 to extend downwardly from the floor assembly 14 adjacent a first side wall 18, while the other system 12 is coupled to the other side of the storage container 15 to extend downwardly from the floor assembly 14 adjacent a second sidewall 18. For purposes of the description herein, however, only one skirt system 12 will be described herein. However, it should be understood that the two skirt systems 12 of the trailer 10 are identical in configuration and function.

Illustratively, the side skirt assembly 20 of the skirt system 12 includes a skirt wall 60 having a single panel 62. It should be understood, however, that the skirt wall 60 may include any suitable number of panels coupled to each other using any suitable fastener(s). The skirt wall 60 is secured to the trailer 10 by one or more mounting bracket assemblies (not shown). In particular, the mounting bracket assemblies of the skirt assembly 20 are configured to couple the skirt wall 60 to the floor assembly 14 of the trailer 10. Any number of mounting bracket assemblies may be used to secure the skirt wall 60 to the trailer 10. Further the mounting bracket assemblies may include any suitable means for attaching the skirt wall 60 to the trailer 10. For example, the mounting bracket assembly of the skirt system 20 may be the same as or similar to the various mounting bracket assemblies disclosed in U.S. Pat. No. 8,177,286 (the entirety of which is incorporated by reference herein) for example.

Illustratively, the skirt wall 60 also includes a flexible member 64 coupled to the bottom edge of the wall panel 62. The flexible member 64 is illustratively made of plastic; however, other suitable flexible materials may be used as well. The flexible member 64 operates to further resist airflow and may prevent damage to the skirt wall 60 from forces applied vertically such as in situations where the trailer 10 may traverse over a curb or railroad track where the road surface is not flat. In such instances, for example, the flexible member 64 is configured to bend, or flex, to prevent damage to the skirt panel 62. Illustratively, the skirt assembly 20 includes a single, unitary flexible member 64 coupled to the wall panel 62. However, it is within the scope of this disclosure for the skirt wall 60 to include any number of flexible members 64.

A height 66 of the skirt wall 60 may be approximately between 32 and 36 inches. The height 66 includes the total height of the skirt wall 60 including the height of the wall panel 62 and the height 66 of the flexible member 64. Illustratively, a distance between the bottom edge of the skirt wall 60 and the ground upon which the trailer 10 rests may be approximately between 7 and 11 inches. This distance represents the ground clearance between the bottom edge of the skirt wall 60 and the ground upon which the trailer 10 rests.

A length 69 of the illustrative skirt wall 60 is approximately 127 inches. The length is measured across a top edge of the skirt wall 60 from a front end 67 of the wall 60 to a rear end 68 of the wall 60. As such, as is noted below, the side skirt wall 60 does not span the entire distance between the landing gear leg 17 and the forward surface of the tires 30 of the rear wheel assembly 16. Further, the side skirt wall 60 is positioned such that the front edge 67 of the side skirt wall 60 is near the landing gear leg 17 in order to leave a gap between the rear edge 68 of the side skirt wall 60 and the front tires 30 of the rear wheel assembly 16 of the trailer 10. As noted above, the trailer 10 is shortened for use in the "doubles" configuration shown in FIG. 4. Thus, for a full-length trailer (not shown), the length of the skirt wall may be longer than the illustrative 127-inch length of the illustrative skirt wall 60 while still leaving a suitable gap between the rear edge of the side skirt wall and the front tires 30 of the rear wheel assembly 16 of the trailer 10.

As shown in FIGS. 2 and 3, the trailer 10 includes a lift pad 70 coupled to each side wall 18 of the trailer 10. The lift pad 70 is provided to allow a lift mechanism (not shown) to engage the lift pads 70 and raise the trailer 10 without damaging the base rail 52 or side walls 18 of the trailer 10. Based upon this constraint of the trailer 10, the skirt wall 60 may generally be limited in length, position, and orientation to span a distance between the landing gear leg 17 and the forward edge of the lift pad 70 of the trailer. As shown in FIG. 3, the rear edge 68 of the skirt wall 60 and the front edge of the lift pad 70 are generally adjacent each other in order to maximize the length of the skirt wall 60 such that only a small gap of approximately 1-2 inches is provided between the skirt wall 60 and the lift pad 70. It should be understood, however, that the skirt wall 60 may be positioned in other locations along a length of the trailer 10 to increase or decrease this gap distance. Further, it should be understood that the skirt wall 60 (or at least rearward portions of the skirt wall 60) may be mounted to the trailer 10 at other locations relative to the trailer 10 so as to not obstruct the use of the lift pads 70 by the lift mechanism.

As shown in FIG. 2, the front edge 67 of the skirt wall 60 is angled relative to the vertical axis such that a length across a bottom edge of the skirt wall 60 is smaller than the total length 69 of the skirt wall 60 as measured across the top edge of the wall 60. It should be understood, however, that while the front edge 67 is configured to angle rearwardly from the top edge of the skirt wall 60 to the bottom edge of the skirt wall 60, the front edge 67 may instead be generally vertical or may be configured to angle forwardly.

Illustratively, as shown in FIG. 3, the skirt wall 60 is parallel to the side wall 18 of the trailer 10 and is generally coplanar with the side wall 18 of the trailer 10. However, it is within the scope of this disclosure for the skirt wall 60 to be angled relative to the side wall 18 of the trailer 10 such that a front end of the skirt wall 60 is positioned inward of a rear end of the skirt wall 60, or visa versa. Further, it is within the scope of this disclosure for the skirt wall 60 to be positioned inward of the side wall 18 of the trailer 10 such that the skirt wall 60 is no longer generally coplanar with the side wall 18 of the trailer 10. Further illustratively, while the skirt wall 60 is generally planar, it is within the scope of this disclosure for portions of the skirt wall to be curved, such as, for example, for a forward end of the skirt wall to be curve inward.

The provision of the longitudinally-extending gap 71 between the rear edge 68 of the skirt wall 60 and the tires 30 of the rear wheel assembly 16 operates to allow air which enters the undercarriage area under the trailer 10 (by traveling under the skirt wall 60 and/or from traveling under the front wall assembly 42 of the trailer 10, for example) to also exit the area under the trailer 10 via the gap provided between the rear edge 68 of the skirt wall 60 and the tires 30 of the rear wheel assembly 16. Allowing the air to escape, or vent, from under the trailer 10 prevents the same air from acting on the rear wheel assembly 16 to impart drag on the trailer 10 as the trailer 10 travels down the highway. The illustrative gap 71 between the rear edge 68 of the skirt wall 60 and a forward surface of the tires 30 is illustratively approximately the length of the lift pad 70 of the trailer 10; however, the gap 71 may be any suitable distance that allows air from under the trailer 10 to escape outwardly and not impinge on the tires 30 of the rear wheel assembly 16.

As noted above, the skirt system 12 of the present disclosure also includes the bogie skirt assembly 22. The bogie skirt assembly 22 is generally positioned rearward of the side skirt assembly 20 and is also coupled to the floor assembly 14 of the trailer 10. Similar to the side skirt assembly 20, the bogie skirt assembly 22 includes a skirt wall 100 having a single panel 102. It should be understood, however, that the skirt wall 100 may include any suitable number of panels coupled to each other using any suitable fastener. The skirt wall 100 is secured to the trailer 10 by one or more mounting brackets in the same or similar manner as that described above in regard the skirt wall 60. Further, the mounting bracket(s) used for the skirt wall 100 may be the same as or different from the particular mounting bracket(s) used to secure the skirt wall 60 to the floor assembly 14 of the trailer 10. The skirt wall 100 also includes a flexible member 104 coupled to the bottom edge of the wall panel 102. The flexible member 104 is also made of plastic as described above in regard to the flexible member 64.

The illustrative height of the skirt wall 100 is the same or similar to the height of the skirt wall 60. However, it should be understood that the height of the skirt wall 100 may be different from that of the skirt wall 60. A length of the illustrative skirt wall 100 is approximately 50 inches; however, the skirt wall 100 may include any suitable length in order to generally deflect crosswind air flow in the area adjacent and forward of the rear wheel assembly in order to prevent the crosswind air flow from entering the area under a middle portion of the trailer 10 generally immediately forward of the tires 30 of the rear wheel assembly 16.

As shown in FIGS. 1 and 3, the skirt wall 100 is angled, and not parallel, relative to the side wall 18 of the trailer 10. Illustratively, the skirt wall 100 is angled inwardly such that a front edge 120 of the skirt wall 100 is positioned inward of a rear edge 122 of the skirt wall 100. As shown in FIG. 3, both the front and rear edges 120, 122 of the skirt wall 100 are positioned inward of a plane defined by the skirt wall 60 of the skirt assembly 20. In particular, the rear edge 122 of the skirt wall 100 is positioned inward of the inside edge of the lift pad 70 of the trailer 10. Illustratively, an angle 130 between the side wall 18 of the trailer 10 and the skirt wall 100 is approximately 45 degrees. However, the skirt wall 100 may be positioned at other suitable angles relative to the sidewall 18 of the trailer 10. Further, it should be understood that the skirt wall 100 may be parallel to the side walls 18 of the trailer 10 as well.

As shown in FIG. 3, the angled positioning of the skirt wall 100 relative to the skirt wall 60 creates a transversely-extending gap 81 between the front edge 120 of the skirt wall 100 and vertical plane of the skirt wall 60 (near the rear edge 68 of the skirt wall 60) to allow air which has entered an area under the trailer 10 to exit the trailer 10 between the two skirt assemblies 20, 22 before impacting the rear wheel assembly 16 and imparting drag on the trailer 10 as the trailer 10 is traveling down the highway. Illustratively, this transversely-extending gap 81 is approximately 30 inches; however, it is within the scope of this disclosure to provide any suitable gap distance between the wall 60 and the front edge 120 of the wall 100. In other words, an exit channel is created between the two walls 60, 100 to direct airflow from under the trailer 10 out and away from the rear wheel assembly 16 to prevent this air from impinging on the tires 30 of the rear wheel assembly 16 and causing drag on the trailer 10.

Illustratively, each skirt wall 60, 100 is made of a composite material. For example, the composite material may include a plastic core and metal outer skins coupled to the plastic core. Such a composite material provides a rigid, but lightweight and durable material. Illustratively, for example, each wall 60, 100 may be made of a DURAPLATE® composite panel provided by Wabash National Corporation of Lafayette, Ind. DURAPLATE® composite panels are constructed of a high-density polyethylene plastic core bonded between two high-strength steel skins. It should be understood that other suitable composite materials may be used as well. Further, the wall panels 60, 100 may be made of any number of suitable, non-composite materials such as metals, metal alloys, and/or plastics, for example.

In operation, the side skirt assembly 20 is positioned between the rear wheel assembly 16 and the landing gear leg 17 in order to prevent air from flowing laterally under the floor assembly 14 of the trailer 10 as the trailer 10 is towed by the tractor 13. However, the side skirt assembly 20 is sized, configured, and positioned such that when air does flow under the trailer 10, the air is allowed to exit back out from under the trailer 10 between the rear end of the skirt assembly 20 and the bogie skirt assembly 22 before imparting its force, and thus causing drag, on any components under the trailer 10. In other words, air that travels under the trailer 10 oftentimes gets stuck under the trailer and generally comes into contact with something under the trailer, such as the wheels 30 of the rear wheel assembly 16, thus imparting drag on the trailer 16. The side skirt assembly 20 operates to optimize the balance between deflecting the flow of air around the trailer 10 and allowing any air which flows under the trailer 10 to exit, or vent, out from under the trailer 10 thus minimizing any contact between the air under the trailer 10 and the front portion of the rear wheel assembly 16 of the trailer 10.

Further, the bogie skirt assembly 22 operates to prevent or reduce any air flow, such as cross-wind air flow, adjacent and forward of the rear wheel assembly 16 from entering the undercarriage region of the trailer 10 in front of the rear wheel assembly 16. In other words, the bogie skirt assembly 22 operates to deflect cross-wind air flow located generally immediately forward of the rear wheel assembly 16 such that the cross-wind air flow does not enter the space under the trailer 10 and immediately in front of the rear wheel assembly 16 to impart drag on the trailer 10 as the trailer 10 travels down the highway. As shown in FIG. 3, the front edges 120 of the right and left bogie skirt assemblies 22 of the trailer 10 are spaced-apart from each other. This opening, or gap, between the bogie skirt assemblies 22 of the trailer operates to allow some of the airflow under the trailer 10 to pass between the two bogie skirt assemblies 22 and past the axle of the rear wheel assembly 16 while redirecting any air that impinges on the skirt wall 100 outwardly and away from the tires 30 of the rear wheel assembly 16 to prevent such air from acting on the tires 30 and imparting drag on the trailer 10.

Thus, in use the side and bogie skirt assemblies 20, 22 cooperate to deflect air and prevent air from entering an area under the trailer 10, while also allowing some air that is under the trailer 10 to exit therefrom without impinging on the wheels 30 of the rear wheel assembly 16. Air that may tuck inside the side skirt assembly 20 and under the trailer 10 is deflected outwardly by the bogie skirt assembly 22 and through the channel between the walls 60, 100 and out the gap 71 to avoid impinging on the tires 30 of the rear wheel assembly 16 and imparting drag on the trailer 10. As noted above, some air that may get stuck under the trailer 10 and inside side skirt assemblies 20 of the trailer 10 is able to exit the undercarriage area of the trailer 10 through a transversely-extending gap, or space 91, between the front end 120 of the two bogie skirt assemblies 22 while only impinging on the axle of the rear wheel assembly 16 thus minimizing any drag caused therefrom. In other words, some air flow in the center of the undercarriage of the trailer 10 may hit the bogie skirt assemblies 22 and be deflected outwardly while some air flow in the center of the undercarriage of the trailer 10 may exit the undercarriage between the two bogie skirt assemblies 22. As noted above, allowing some air to exit between the bogie skirt assemblies 22 may operate to create less drag than if this central air were to impact a centrally-located skirt positioned generally between the existing gap between the two bogie skirt assemblies 22 of the trailer 10. As shown illustratively in FIG. 3, the space 91 is approximately equal to a distance between the right and left sets of tires of the rear wheel assembly 16. In other words, drag on only the axle of the rear wheel assembly 16 does not produce as much drag as air impacting some barrier in the location of the axle between the two sets of tires 30 of the rear wheel assembly 16.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. An aerodynamic skirt system for reducing drag on a trailer, comprising:
   a first side skirt wall configured to be coupled to the trailer on one side of the trailer to extend generally below a storage container of the trailer at least partially along a length of the trailer; and
   a second side skirt wall spaced-apart from the first side skirt wall and configured to be coupled to the trailer on the one side of the trailer to extend generally below the storage container of the trailer at least partially along the length of the trailer,
   wherein the side skirt system defines a longitudinally-extending gap between a rear edge of the first side skirt wall and a rear wheel assembly of the trailer, wherein the longitudinally-extending gap is at least approximately the same length as a lift pad of the trailer, wherein the side skirt system defines a generally funnel-shaped channel between first and second side skirt walls, and wherein the channel is configured to direct air from under the trailer to exit the longitudinally-extending gap.

2. The aerodynamic skirt system of claim 1, wherein:
   the first side skirt wall defines a first length, and
   the second side skirt wall defines a second length smaller than the first length, wherein the second side skirt wall is positioned generally rearward of the first side skirt wall, and wherein the second side skirt wall is angled relative to the side wall of the trailer.

3. The aerodynamic skirt system of claim 2, wherein the second side skirt wall is angled approximately 45 degrees relative to the side wall of the trailer.

4. The aerodynamic skirt system of claim 3, wherein the first side skirt wall is generally parallel to the side wall of the trailer.

5. The aerodynamic skirt system of claim 2, wherein a forward edge of the second side skirt wall is positioned forward of a rearward edge of the first side skirt wall.

6. The aerodynamic skirt system of claim 2, wherein the first length is greater than two times the second length.

7. The aerodynamic skirt system of claim 6, wherein the first length is approximately 127 inches and the second length is approximately 50 inches.

8. The aerodynamic skirt system of claim 1, wherein the skirt system defines a transversely-extending gap of the funnel-shaped channel of approximately 30 inches between the first side skirt wall and a front edge of the second side skirt wall, and wherein the transversely-extending gap is configured to allow air from under the trailer to exit the longitudinally-extending gap.

9. The aerodynamic skirt system of claim 2, wherein the first side skirt wall is parallel to a sidewall of the trailer.

10. The aerodynamic skirt system of claim 9, wherein the first side skirt wall is generally planar with the sidewall of the trailer.

11. The aerodynamic skirt system of claim 1, further comprising a third side skirt wall configured to be coupled to the trailer on the other side of the trailer to extend generally below a storage container of the trailer at least partially along a length of the trailer, the third side skirt wall defines a length substantially equivalent to the first length; and
   a fourth side skirt wall spaced-apart from the third side skirt wall and configured to be coupled to the trailer on the other side of the trailer to extend generally below the storage container of the trailer at least partially along the length of the trailer, wherein a length of the fourth side skirt wall is substantially equivalent to the second length, wherein the fourth side skirt wall is positioned generally rearward of the third side skirt wall, and wherein the fourth side skirt wall is angled relative to the side wall of the trailer.

12. The aerodynamic skirt system of claim 11, wherein the system defines a transversely-extending gap between a front edge of the second and fourth skirt walls.

13. The aerodynamic skirt system of claim 12, wherein the transversely-extending gap is approximately equal to a distance between right and left sets of tires of a rear wheel assembly of the trailer.

14. An aerodynamic skirt system for reducing drag on a trailer, comprising:
   a first side skirt wall configured to be coupled to the trailer on one side of the trailer to extend generally below a storage container of the trailer at least partially along a length of the trailer, the first side skirt wall defines a first length; and
   a second side skirt wall spaced-apart from the first side skirt wall and configured to be directly coupled to a floor assembly of the trailer on the one side of the trailer to extend generally below the storage container of the trailer at least partially along the length of the trailer at a fixed location thereon, wherein the second side skirt wall defines a second length smaller than the first length, wherein the second side skirt wall is positioned generally rearward of the first side skirt wall, and wherein the second side skirt wall is angled relative to the side wall of the trailer, and
  wherein a rearward edge of the second side skirt wall is inward of a rearward edge of the first side skirt wall.

15. An aerodynamic skirt system for reducing drag on a trailer, comprising:
   a first side skirt wall configured to be coupled to the trailer on one side of the trailer to extend generally below a storage container of the trailer at least partially along a length of the trailer;
   a second side skirt wall spaced-apart from the first side skirt wall and configured to be coupled to the trailer on the one side of the trailer to extend generally below the storage container of the trailer at least partially along the length of the trailer;
   a third side skirt wall configured to be coupled to the trailer on the other side of the trailer to extend generally below the storage container of the trailer at least partially along the length of the trailer; and
   a fourth side skirt wall spaced-apart from the third side skirt wall and configured to be coupled to the trailer on the other side of the trailer to extend generally below the storage container of the trailer at least partially along the length of the trailer,
   wherein each of the second and fourth side skirt walls are positioned inwardly of the first and third side skirt walls, and wherein the side skirt system further includes a transversely-extending gap between front edges of the second and fourth side skirt walls,
   wherein the side skirt system further includes a generally funnel-shaped channel between each of the first and second side skirt walls and the third and fourth side skirt walls, and wherein each channel is configured to direct air from under the trailer to exit a gap between each respective first side skirt wall and the rear wheel assembly.

16. The side skirt system of claim 15, wherein the side skirt system is positioned between a landing gear of the trailer and a rear wheel assembly of the trailer.

* * * * *